(12) United States Patent
Jin et al.

(10) Patent No.: US 9,848,473 B1
(45) Date of Patent: Dec. 19, 2017

(54) ROAD LAMP CONTROL METHOD

(71) Applicant: China Jiliang University, Hangzhou, Zhejiang (CN)

(72) Inventors: Huaizhou Jin, Hangzhou (CN); Kaiyuan Liu, Hangzhou (CN); Shangzhong Jin, Hangzhou (CN); Liang Chen, Hangzhou (CN); Kun Yuan, Hangzhou (CN); Songyuan Cen, Hangzhou (CN)

(73) Assignee: China Jiliang University, Hangzhou, Zheijiang (CN)

(*) Notice: Subject to any disclaimer, the term of this patent is extended or adjusted under 35 U.S.C. 154(b) by 0 days.

(21) Appl. No.: 15/232,086

(22) Filed: Aug. 9, 2016

(30) Foreign Application Priority Data

Jun. 6, 2016 (CN) .......................... 2016 1 0397995

(51) Int. Cl.
| | |
|---|---|
| *H05B 33/08* | (2006.01) |
| *G08G 1/01* | (2006.01) |
| *G08G 1/056* | (2006.01) |
| *H05B 37/02* | (2006.01) |
| *F21S 8/08* | (2006.01) |
| *F21Y 115/10* | (2016.01) |
| *F21W 131/103* | (2006.01) |
| *H04W 4/02* | (2009.01) |

(52) U.S. Cl.
CPC .......... *H05B 33/0854* (2013.01); *F21S 8/086* (2013.01); *G08G 1/0137* (2013.01); *G08G 1/056* (2013.01); *H05B 37/0227* (2013.01); *H05B 37/0272* (2013.01); *H05B 37/0281* (2013.01); *F21W 2131/103* (2013.01); *F21Y 2115/10* (2016.08); *H04W 4/02* (2013.01)

(58) Field of Classification Search
CPC ............ H05B 33/0815; H05B 33/0818; H05B 33/0884; H05B 33/0809; H05B 33/0848; H05B 33/0896; H05B 37/0245; H05B 37/0254; H05B 41/3925; H05B 41/391; H05B 41/2828; H05B 33/0803; H05B 37/0272; H05B 33/0857; H05B 33/0887
USPC ........................................ 315/307, 224, 309
See application file for complete search history.

(56) References Cited

U.S. PATENT DOCUMENTS

| | | | | |
|---|---|---|---|---|
| 9,622,323 | B2 * | 4/2017 | Hartman | H05B 37/0227 |
| 2008/0310850 | A1 * | 12/2008 | Pederson | G07C 9/00158 |
| | | | | 398/135 |
| 2009/0034258 | A1 * | 2/2009 | Tsai | H05B 37/02 |
| | | | | 362/253 |
| 2013/0257284 | A1 * | 10/2013 | VanWagoner | H05B 37/0245 |
| | | | | 315/131 |
| 2013/0297212 | A1 * | 11/2013 | Ramer | H05B 37/0245 |
| | | | | 702/1 |
| 2013/0346229 | A1 * | 12/2013 | Martin | G06Q 40/00 |
| | | | | 705/26.3 |

(Continued)

*Primary Examiner* — Douglas W Owens
*Assistant Examiner* — Syed M Kaiser
(74) *Attorney, Agent, or Firm* — Wood Herron & Evans LLP

(57) ABSTRACT

A road lamp control method is disclosed, comprising steps of determining whether a road lamp lighting condition is satisfied, and controlling the road lamp lighting time period. The method can control ON and OFF and the brightness of the road lamps in real time based on the real traffic flow at night, and thereby ensuring safety of pedestrians and vehicles and saving electrical energy.

11 Claims, 2 Drawing Sheets

(56) References Cited

U.S. PATENT DOCUMENTS

2014/0125250 A1* 5/2014 Wilbur ................ H01Q 1/2291
                                                                           315/297
2017/0045626 A1* 2/2017 Hartman ................ G08G 1/087

* cited by examiner

ROAD LAMP CONTROL METHOD

CROSS-REFERENCE TO RELATED APPLICATION

This application claims priority to Chinese Application No. 201610397995.9, which was filed Jun. 6, 2016. This prior application is incorporated herein by reference, in its entirety.

TECHNICAL FIELD

The present invention relates to a field of road lamp control, especially to a road lamp control method.

BACKGROUND

At present, usage of urban roads at night is low, especially during a period from midnight to dawn. If all road lamps on the roads are on all through the night, it would bring about energy waste and inefficiencies, and pollution from power plants would not be ignored either. However, if none or only certain road lamps are on in a certain period of time at night, it would seriously influence normal walking of pedestrians and driving safety of vehicles. Targets of energy-efficiency and emission reduction are also needed to be realized while the safety of pedestrians and vehicles can be ensured.

Some simple road lamp control methods have been disclosed. They, for example, choose to turn off all the lamps on the roads with low traffic flow during a period from midnight to dawn, or to control ON and OFF of all the lamps according to the time of sunset and sunrise or ambient lighting conditions detected by photoelectric devices. These methods can save 20-40% power compared with the method that all lamps are on all through the night, and can prolong service life of road lamps effectively. However, these methods are unable to ensure road safety at night.

SUMMARY

An objective of the present invention is to provide a road lamp control method, which could solve the energy waste problem of the prior art, and can control ON and OFF and the brightness of road lamps in real-time on the basis of the flow of pedestrians, non-motor and motor vehicles at night, thereby ensuring safety of the pedestrians and the vehicles and saving electrical energy.

To achieve the aforementioned objective, the present invention provides a road lamp control method. A system implementing the method comprises a location tracking detection unit, a LED road lamp, a road-lamp control unit, a road-lamp brightness control unit, a information transmitting unit and a road-lamp drive unit, wherein, the road-lamp control unit is equipped with a location tracking receiver. After the location tracking receiver detects a location, a moving direction and a speed of the location tracking detection unit, the brightness control unit controls ON and OFF and brightness of the LED road lamp via the road-lamp control unit, the information transmitting unit and the road-lamp drive unit. The method comprises steps as follows:

determining whether a road lamp lighting condition is satisfied: if a current location tracking receiver or adjacent location tracking receiver detects the location tracking detection unit, the road lamp is turned on, otherwise the road lamp is turned off and next determination is made; and controlling the road lamp lighting time period: if the current location tracking receiver or adjacent location tracking receiver detects no location tracking detection unit, the road lamp is delayed to be turned off.

In one embodiment, the location tracking detection unit is a GPS device or a Big Dobber sensor carried by pedestrians or vehicles, and the location tracking receiver can detect, within 15 meters near it, the location, the moving direction and the speed of the location tracking detection unit, and distinguish among pedestrians, non-motor and motor vehicles on the basis of the speed and the displacement, and would not be triggered by any other object to cause a misjudgment.

In one embodiment, the location tracking receiver can distinguish between a vehicle model and a pedestrian model on the basis of the moving speed: it is the vehicle model if the speed is greater than 15 km/h, and it is the pedestrian model if the speed is less than or equal to 15 km/h.

In one embodiment, the road-lamp control unit transmits information acquired by the current location tracking receiver with which the current road lamp is equipped to adjacent road lamps via the information transmitting circuit, and detects brightness information recorded in the road-lamp control units of the adjacent road lamps.

In one embodiment, the road-lamp brightness control unit, on the basis of brightness information acquired by the current location tracking receiver and other location tracking receivers of adjacent road lamps, determines the brightness of the current and adjacent road lamps, sends out brightness control information of the current and adjacent road lamps, and thus drives the current and adjacent road lamps to be on or off and adjusts their brightness.

In one embodiment, when the location tracking receiver detects a moving object of the pedestrian mold, the current road-lamp brightness control program makes the current road lamp to be completely lighted up via the road-lamp control unit and the road-lamp drive unit.

In one embodiment, if the current location tracking receiver detects the pedestrian mold and detects that adjacent location tracking receivers ahead or behind have detected a moving object, the current road lamp is completely lighted up; and if the current location tracking receiver detects that adjacent location tracking receivers behind have detected no moving object, but detects that the nth location tracking receiver behind has detected a moving object, the brightness of the current road lamp is set to be $(100-(n-1)q)$ % of that of the road lamp corresponding to the nth location tracking receiver, wherein $q=15$-$25$.

In one embodiment, if the location tracking receiver detects a moving object of the vehicle model, the current road-lamp brightness control unit makes the current LED road lamp to be completely lighted up via the road-lamp control unit and the road-lamp drive unit.

In one embodiment, if the current location tracking receiver detects no moving object but detects that adjacent location tracking receivers behind or ahead have detected a moving object, the current road lamp is completely lighted up; and if the current location tracking receiver detects that adjacent location tracking receivers behind have detected no moving object, but detects that the $m^{th}$ location tracking receiver behind has detected a moving object, the current road lamp is completely lighted up, otherwise the current road lamp is off, wherein $m \leq 3$.

In one embodiment, if the location tracking receiver detects no moving object, the current road lamp will be off after a delay time t, wherein $30\,s \leq t \leq 3\,min$; and a response time from receiving a control signal to turning on the road lamp is less than 0.001 s, such that a moving distance of the moving object during the period when the brightness of the road lamp is adjusted is less than 5 cm.

The method of the invention can control ON and OFF and the brightness of road lamps in real time based on the real traffic flow at night, and thereby ensuring safety of pedestrians and vehicles and saving electrical energy.

DETAILED DESCRIPTION

Preferred embodiments of the present invention will be described below in detail with reference to the accompanying drawings.

Figure 1:
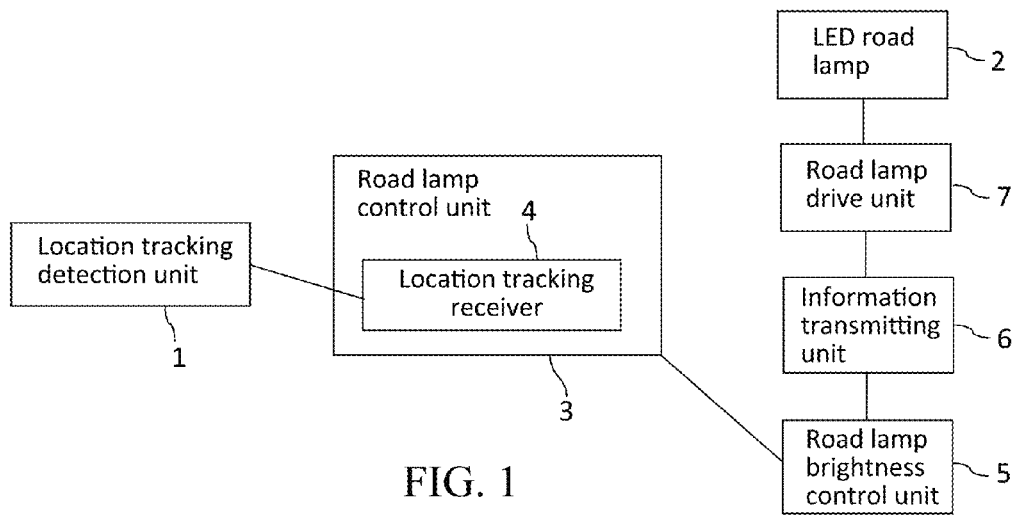
FIG. 1 is a schematic view of an exemplary system implementing the present invention.

With reference to FIG. 1, an exemplary system implementing the road lamp control method of the present invention comprises a location tracking detection unit 1, a LED road lamp 2, a road-lamp control unit 3, a road-lamp brightness control unit 5, a information transmitting unit 6 and a road-lamp drive unit 7. The road-lamp control unit 3 is equipped with a location tracking receiver 4. After the location tracking receiver 4 detects a location, a moving direction and a speed of the location tracking detection unit 1, the road-lamp brightness control unit 5 controls ON and OFF and the brightness of the LED road lamp 2 via the road-lamp drive unit 7, the road-lamp control unit 3 and the information transmitting unit 6. This system can dynamically control ON and OFF and the brightness of road lamps on the basis of information from displacement detectors of current road lamps where pedestrians or vehicles are at and of adjacent road lamps.

Controlling ON and OFF of road lamps does not mean that, when a detector detects a pedestrian or a vehicle passing by, only the road lamp which is equipped with this detector needs to be turned on. For pedestrians and vehicles passing by, usually, only a plurality of lighting road lamps would ensure their safety. A distance between adjacent road lamps on the road is generally 30 meters. When pedestrians are passing by, not only a sufficient number of lighting road lamps ahead can ensure walking safety, but the soft and long-distance diminishing brightness can give the pedestrians a sense of security.

However, for vehicle drivers, requirements for light are different. The vehicle's top speed (which is generally the speed limit of the viaduct in China) is about 80 km/h (The present invention does not take into account conditions of serious speeding and illegal act.). When vehicles are passing by quickly, a sufficient number of road lamps ahead need to be turned on, such that there is always sufficient light ahead when the vehicles are moving forward quickly. According to that the object detected by the detector of claim 2 is a pedestrian or a vehicle, the local control system program of the present invention controls the on-off state of the road lamp which is equipped with the detector, as shown in FIG. 2.

Figure 2:
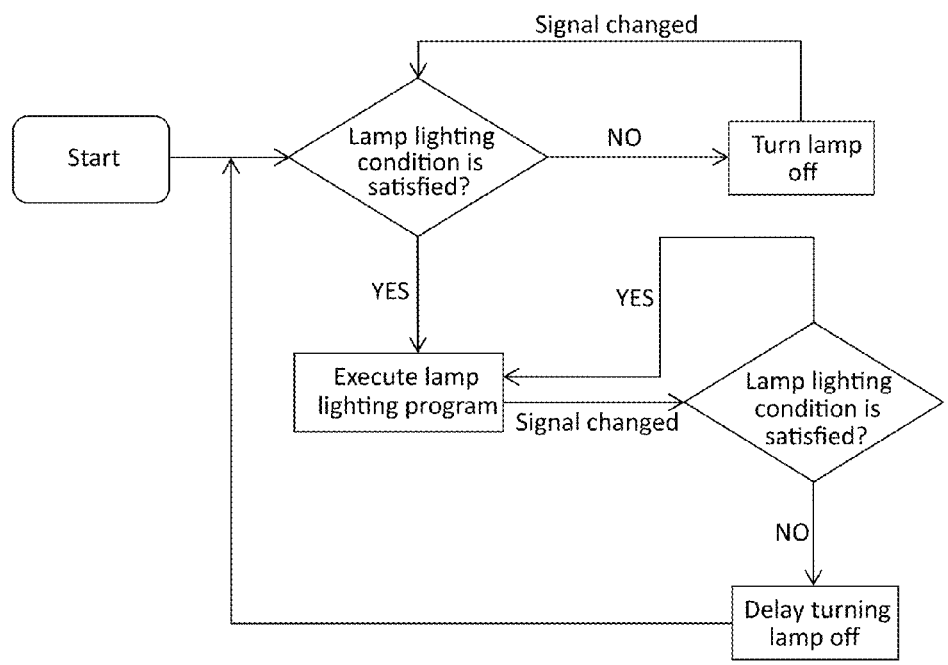
FIG. 2 is a flow chart of the total program of the present invention.

In the flow chart of FIG. 2, there are three most importance steps. The first step is to determine whether a road lamp lighting condition is satisfied. The road lamp lighting condition has two aspects: if the current detector in which the control program is located detects a pedestrian or a vehicle, or the control program receives signals from an adjacent detector that a pedestrian or a vehicle is passing by, the road lamp lighting condition will be satisfied. When the road lamp lighting condition is satisfied, the program will proceed to the next step, i.e., to execute a road lamp lighting program. This state will last until the pedestrian or the vehicle leaves, or any other adjacent detector sends signals that the pedestrian or the vehicle enters or leaves (which is expressed as "signal changed" in FIG. 2). In these cases, the program will re-determine whether a road lamp lighting condition is satisfied.

The step of executing the road lamp lighting program also comprises two aspects: turning on road lamps and adjusting the brightness of the road lamps on the basis of signals from the detector in which the program is located or from any adjacent detector.

If a detector detects a pedestrian passing by, and detects the moving direction of the pedestrian via a speed detector of claim 3, the detector will transmit the information of presence of the pedestrian and his or her moving direction to the control program, and then the control program will control the road lamp which is equipped with the detector and each one road lamp before and after the pedestrian to be on. For pedestrians, road lamps farther away do not need to be completely lighted up. The brightness of road lamps beginning with the second one before the pedestrian diminishes by q % per road lamp, which means that the brightness of the second road lamp is (1-q) % of that of the road lamp where the pedestrian is at, the brightness of the third one is (1-2q) %, and so on, as shown in FIG. 3.

Figure 3:
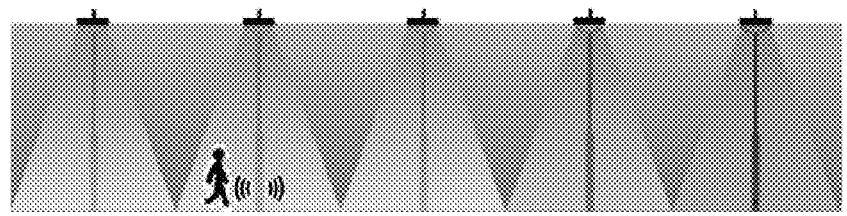
FIG. 3 is a schematic view of road lamps when a pedestrian is detected according to the present invention.
Figure 4:
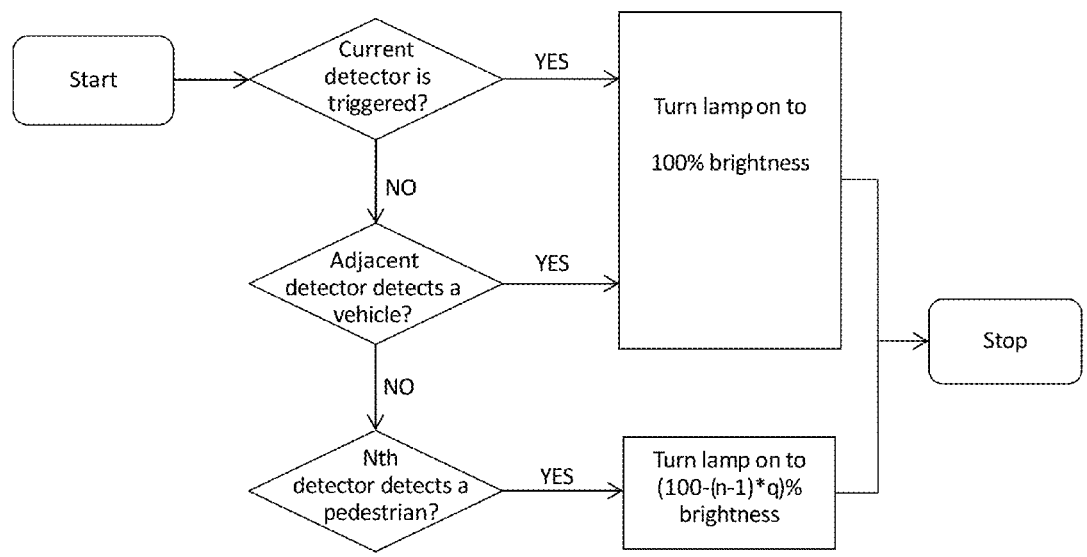
FIG. 4 is a flow chart of the road lamp lighting program of the present invention.

With reference to FIG. 3, the detector of the second road lamp from the left detects a pedestrian, so the second road lamp and each one road lamp before and after it are completely lighted up, and the brightness of the third one begins to diminish. If a speed detector is unable to determine the moving direction of the pedestrian, the brightness of road lamps beginning with each second road lamp before and after the pedestrian follows a diminution of q % per road lamp. Based on this principle, if q=25, the brightness of the fifth road lamp before the pedestrian will be diminished to be zero, i.e., road lamps beginning with the fifth one do not need to be lighted up.

If a detector detects a vehicle passing by, three road lamps before the vehicle and one road lamp after the vehicle are lighted up (even if there is no vehicle coming behind, it is better to turn on one road lamp after the vehicle, such that the driver will feel secure when he or she looks in the rear-view mirror, because of the light behind the vehicle). Road lamps beginning with the fourth one do not need to be lighted up.

For the execution of the road lamp lighting program, among the priority levels of executing the program after a signal is received, the first is the detector of the road lamp where the pedestrian or the vehicle is at, the second is the detector of adjacent three road lamps which detects a vehicle, and the last is the detector of adjacent four road lamps which detects a pedestrian.

When the detector of the road lamp where a pedestrian or a vehicle is at or the detector of the adjacent road lamps sends signals that the pedestrian or the vehicle is entering or leaving, the total program as shown in FIG. 2 will re-determine whether the road lamp lighting condition is satisfied. If the condition is satisfied, the road lamp lighting program will be executed, and then road lamps will be lighted up, or the brightness of road lamps will be adjusted, according to the flow chart of FIG. 3. The road lamp lighting program will not trigger itself to run in order to avoid an entrance of an endless loop.

If a control program of a road lamp which is on receives a signal that the road lamp lighting condition is not satisfied, a third step, i.e., delaying turning off the road lamp, will be started. This step is relatively simple. Every time when a signal is triggered as a pedestrian leaves a detector, the detector will make a record and maintain this for 30 seconds. If the program finds this record while the step of delaying turning off the road lamp is started, the program will be lasted for 30 seconds. If the road lamp lighting condition does not change during the 30 seconds (i.e., the road lamp lighting condition has not been satisfied during the 30 seconds), the road lamp will be turned off. If there is no such a record, i.e., all the objects passing by are vehicles, the program will only be lasted for 10 seconds. If the road lamp lighting condition has not been satisfied during the 10 seconds, the road lamp will be turned off. One reason why the program is designed like this is that vehicles leave quickly and do not need road lamps to be on for a long delay time, but the speed of pedestrians is lower and therefore they need a longer delay time. If both vehicles and pedestrians are on the road at the same time, it should assure the pedestrians of sufficient light.

Detectors of road lamps at a crossroads execute a control program that all these road lamps are completely lighted up. The traffic state of the crossroads is complex and accidents are more likely to happen. So, these lamps need to be always completely lighted up all through the night. However, detectors of adjacent lamps still require signals from the detectors of the road lamps at the crossroads to control ON and OFF of the lamps far away from the crossroads.

At last, in accordance with the latitude and date of the place where road lamps are located, the program is started as the road lamps are turned on from 5:00 pm to 7:00 pm, and continues to run until 5:00 am-7:00 am the next morning. The program is terminated as all the road lamps are turned off.

According to a result of computer simulation, compared with that all road lamps are completely lighted up, for the roads with lower traffic flow (less than 1500 vehicles a day), the method of the present invention can improve the energy efficiency by over 75%, while, for the roads with higher traffic flow (6000-8000 vehicles a day), the method of the present invention can improve the energy efficiency by 40%-50%. When being simulated, the method of the present invention can satisfy the requirements of pedestrians and vehicles for light, dynamically control on-off of road lamps based on the actual conditions of traffic on roads, and achieve energy-efficiency targets while meeting the requirements of pedestrians and vehicles at night.

The above described is merely preferred embodiments of the present invention, and not exemplified to intend to limit the present invention. Any modifications and changes without departing from the scope of the spirit of the present invention are deemed as within the scope of the present invention.

While the present invention has been illustrated by a description of exemplary embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in any combination depending on the needs and preferences of the user. This has been a description of the preferred methods of practicing embodiments of the invention as currently known. However, the invention itself should only be defined by the appended claims.

What is claimed is:

1. A road lamp control method, a system implementing the method comprising a location tracking detection unit, a LED road lamp, a road-lamp control unit, a road-lamp brightness control unit, an information transmitting unit and a road-lamp drive unit; wherein, the road-lamp control unit is equipped with a location tracking receiver, and after the location tracking receiver detects a location, a moving direction and a moving speed of the location tracking detection unit, the brightness control unit controls ON and OFF and brightness of the LED road lamp via the road-lamp control unit, the information transmitting unit and the road-lamp drive unit; the method comprising:
   determining whether a road lamp lighting condition is satisfied: if a current location tracking receiver or adjacent location tracking receiver detects the location tracking detection unit, the road lamp is turned on, otherwise the road lamp is turned off and next determination is made; and
   controlling a road lamp lighting time period: if the current location tracking receiver or adjacent location tracking receiver detects no location tracking detection unit, the road lamp is delayed to be turned off,
   wherein the location tracking receiver can distinguish between a vehicle model and a pedestrian model on the basis of the moving speed of the location tracking detection unit: it is the vehicle model if the speed is greater than 15 km/h, and it is the pedestrian model if the speed is less than or equal to 15 km/h.

2. The method according to claim 1, wherein the location tracking detection unit includes at least one of a GPS device and a satellite sensor carried by pedestrians or vehicles, and the location tracking receiver can detect, within 15 meters near it, the location, the moving direction and the speed of the location tracking detection unit, and would not be triggered by any other object to cause a misjudgment.

3. The method according to claim 1, wherein the road-lamp control unit transmits information acquired by the current location tracking receiver with which the current road lamp is equipped to adjacent road lamps via an information transmitting circuit, and detects brightness information recorded in the road-lamp control units of the adjacent road lamps.

4. The method according to claim 1, wherein the road-lamp brightness control unit, on the basis of brightness information acquired by the current location tracking receiver and other location tracking receivers of adjacent road lamps, determines the brightness of the current and adjacent road lamps, sends out brightness control information of the current and adjacent road lamps, and thus drives the current and adjacent road lamps to be on or off and adjusts their brightness.

5. The method according to claim 2, wherein, when the location tracking receiver detects a moving object of the pedestrian model, the current road-lamp brightness control unit makes the current road lamp to be completely lighted up via the road-lamp control unit and the road-lamp drive unit.

6. The method according to claim 1, wherein, when the location tracking receiver detects a moving object of the pedestrian model, the current road-lamp brightness control unit makes the current road lamp to be completely lighted up via the road-lamp control unit and the road-lamp drive unit.

7. The method according to claim 6, wherein, if the current location tracking receiver detects the pedestrian model and detects that adjacent location tracking receivers ahead or behind have detected a moving object, the current road lamp is completely lighted up; and if the current location tracking receiver detects that adjacent location tracking receivers behind have detected no moving object, but detects that the nth location tracking receiver behind has detected a moving object, the brightness of the current road lamp is set to be $(100-(n-1)q)$ % of that of the road lamp corresponding to the nth location tracking receiver, wherein q=15-25.

8. The method according to claim 2, wherein, if the location tracking receiver detects a moving object of the vehicle model, the current road-lamp brightness control unit makes the current LED road lamp to be completely lighted up via the road-lamp control unit and the road-lamp drive unit.

9. The method according to claim 1, wherein, if the location tracking receiver detects a moving object of the vehicle model, the current road-lamp brightness control unit makes the current LED road lamp to be completely lighted up via the road-lamp control unit and the road-lamp drive unit.

10. The method according to claim 9, wherein, if the current location tracking receiver detects no moving object but detects that adjacent location tracking receivers behind or ahead have detected a moving object, the current road lamp is completely lighted up; and if the current location tracking receiver detects that adjacent location tracking receivers behind have detected no moving object, but detects that the $m^{th}$ location tracking receiver behind has detected a moving object, the current road lamp is completely lighted up, otherwise the current road lamp is off, wherein $m \leq 3$.

11. The method according to claim 10, wherein if the location tracking receiver detects no moving object, the current road lamp will be off after a delay time t, wherein 30 s$\leq$t$\leq$3 min; and a response time from receiving a control signal to turning on the road lamp is less than 0.001 s, such that a moving distance of the moving object during the period when the brightness of the road lamp is adjusted is less than 5 cm.

\* \* \* \* \*